(12) United States Patent
Honda et al.

(10) Patent No.: US 7,794,616 B2
(45) Date of Patent: Sep. 14, 2010

(54) ETCHING GAS, ETCHING METHOD AND ETCHING GAS EVALUATION METHOD

(75) Inventors: Masanobu Honda, Nirasaki (JP);
Akinori Kitamura, Nirasaki (JP);
Kazuya Nagaseki, Nirasaki (JP)

(73) Assignee: Tokyo Electron Limited, Tokyo (JP)

(*) Notice: Subject to any disclaimer, the term of this patent is extended or adjusted under 35 U.S.C. 154(b) by 157 days.

(21) Appl. No.: 11/199,085

(22) Filed: Aug. 9, 2005

(65) Prior Publication Data

US 2006/0027530 A1  Feb. 9, 2006

Related U.S. Application Data

(60) Provisional application No. 60/603,546, filed on Aug. 24, 2004.

(30) Foreign Application Priority Data

Aug. 9, 2004  (JP) .............................. 2004-232309

(51) Int. Cl.
*B44C 1/22* (2006.01)
*H01L 21/302* (2006.01)

(52) U.S. Cl. .......................... 216/67; 216/58; 216/59; 438/706

(58) Field of Classification Search .................. 438/14, 438/706; 252/79.1, 79.4; 216/58–59, 67
See application file for complete search history.

(56) References Cited

U.S. PATENT DOCUMENTS

| | | | | |
|---|---|---|---|---|
| 5,413,940 A | * | 5/1995 | Lin et al. ....................... | 438/14 |
| 5,770,098 A | * | 6/1998 | Araki et al. .................... | 216/67 |
| 5,966,586 A | * | 10/1999 | Hao .............................. | 438/7 |
| 6,569,774 B1 | * | 5/2003 | Trapp .......................... | 438/706 |
| 2002/0182876 A1 | * | 12/2002 | Kawai .......................... | 438/706 |
| 2003/0064603 A1 | * | 4/2003 | Komada ..................... | 438/743 |
| 2004/0035826 A1 | * | 2/2004 | Adachi et al. ................. | 216/67 |

FOREIGN PATENT DOCUMENTS

| | | |
|---|---|---|
| JP | 4-346428 | 12/1992 |
| JP | 6-338479 | 12/1994 |
| JP | 9-148314 | 6/1997 |
| JP | 9-270461 | 10/1997 |
| JP | 2000-150465 | 5/2000 |

* cited by examiner

*Primary Examiner*—Shamim Ahmed
(74) *Attorney, Agent, or Firm*—Oblon, Spivak, McClelland, Maier & Neustadt, L.L.P.

(57) ABSTRACT

An etching gas for etching an oxide film formed on a substrate, includes a main gas composed of an unsaturated fluorocarbon-based gas; and an additive gas composed of a straight-chain saturated fluorocarbon-based gas expressed by $C_XF_{(2X+2)}$ (x represents a natural number of 5 or larger). The additive gas is $C_5F_{12}$ gas, $C_6F_{14}$ gas or $C_7F_{16}$ gas. Another etching gas includes a main gas composed of an unsaturated fluorocarbon-based gas; and an additive gas composed of a cyclic saturated fluorocarbon-based gas expressed by $C_XF_{2X}$ (X represents a natural number of 5 or larger). In this case, the additive gas is $C_5F_{10}$ gas or $C_6F_{12}$ gas.

10 Claims, 7 Drawing Sheets

INCREASE IN ETCHING RATE

| | NO ADDITIVE GAS | $C_3F_8$ ADDITION |
|---|---|---|
| $C_5F_{12}$ | 126%UP | 8%UP |
| $C_6F_{14}$ | 133%UP | 14%UP |

INCREASE IN ETCHING RATE

|  | NO ADDITIVE GAS | $C_3F_8$ ADDITION |
|---|---|---|
| $C_5F_{12}$ | 126%UP | 8%UP |
| $C_6F_{14}$ | 133%UP | 14%UP |

US 7,794,616 B2

ETCHING GAS, ETCHING METHOD AND ETCHING GAS EVALUATION METHOD

FIELD OF THE INVENTION

The present invention relates to an etching gas for etching an oxide film on a substrate, an etching method using the etching gas, and an evaluation method for the etching gas.

BACKGROUND OF THE INVENTION

In a manufacturing process of a semiconductor device using a photolithography technique, etching is used to be performed on a silicon oxide film ($SiO_2$ film) used as, e.g., an insulation film and the like. For example, in a parallel plate type processing apparatus, the etching on the silicon oxide film is performed by ionizing an etching gas in a plasma atmosphere to allow the ionized etching gas to chemically react with the silicon oxide film.

In general, a fluorocarbon-based gas whose chemical formula is expressed by $C_xF_y$ (x, y represent natural numbers) has been used as an etching gas for etching the silicon oxide film. Conventionally, a low-order saturated fluorocarbon-based gas such as $CF_4$ and $C_4F_8$ having a small number of carbon atoms is used to be employed. Recently, however, an unsaturated fluorocarbon-based gas such as $C_4F_6$ begins to be used as the etching gas (see, for example, Japanese Patent Laid-open Application No. H6-275568). Since the unsaturated etching gas is difficult to be decomposed and easy to be polymerized in comparison with the conventional one, it would be deposited on a mask surface of the silicon oxide film as a protection film to thereby provide a high etching selectivity.

In case of using the unsaturated etching gas such as $C_4F_6$, however, the ratio of fluorine atoms to carbon atoms is decreased and at the same time, the absolute amount of the fluorine atoms gets reduced compared with the case of using the saturated gas such as $CF_4$, resulting in a reduction of an etching rate. Since single sheet type etching apparatuses have been most commonly employed in recent days, the reduction of the etching rate would result in a significant decrease in productivity of semiconductor devices.

SUMMARY OF THE INVENTION

It is, therefore, an object of the present invention to provide an etching gas capable of etching an oxide film such as a silicon oxide film at a high etching rate while maintaining a high etching selectivity; an etching method using the etching gas; and an evaluation method for the etching gas.

In accordance with one aspect of the present invention, there is provided an etching gas for etching an oxide film formed on a substrate, including: a main gas composed of an unsaturated fluorocarbon-based gas; and an additive gas composed of a straight-chain saturated fluorocarbon-based gas expressed by $C_xF_{(2x+2)}$ (x represents a natural number of 5 or larger).

The inventors have found that, by adding to the main gas composed of an unsaturated fluorocarbon-based gas the additive gas composed of a straight-chain saturated fluorocarbon-based gas expressed by $C_xF_{(2x+2)}$ (x represents an integer of 5 or larger), it is possible to increase an etching rate while maintaining a high etching selectivity. The additive gas may be $C_5F_{12}$ gas, $C_6F_{14}$ gas or $C_7F_{16}$ gas.

In accordance with another aspect of the present invention, there is provided an etching gas for etching an oxide film formed on a substrate, including: a main gas composed of an unsaturated fluorocarbon-based gas; and an additive gas composed of a cyclic saturated fluorocarbon-based gas expressed by $C_xF_{2x}$ (x represents a natural number of 5 or larger).

The inventors have found that, by adding to the main gas composed of an unsaturated fluorocarbon-based gas the additive gas composed of a cyclic saturated fluorocarbon-based gas expressed by $C_xF_{2x}$ (x represents a natural number of 5 or larger), it is possible to increase an etching rate while maintaining a high etching selectivity. In addition, in this case, the etching selectivity can be further increased compared with that in the case of adding the straight-chain saturated fluorocarbon-based gas. Furthermore, the additive gas may be $C_5F_{10}$ gas or $C_6F_{12}$ gas.

The main gas may be $C_5F_8$ gas or $C_4F_6$ gas. The $C_5F_8$ gas includes cyclic c-$C_5F_8$ gas, straight-chain 1,3-$C_5F_8$ gas and 2-$C_5F_8$ gas. Further, the $C_4F_6$ gas includes cyclic c-$C_4F_6$ gas, straight-chain 1,3-$C_4F_6$ gas and 2-$C_4F_6$ gas.

The main gas may be a cyclic unsaturated fluorocarbon-based gas, such as either $C_6F_6$ gas or $C_7F_8$ gas.

In accordance with still another aspect of the present invention, there is provided a method for etching an oxide film formed on a substrate, including the steps of: introducing an etching gas including a main gas composed of an unsaturated fluorocarbon-based gas and an additive gas composed of a straight-chain saturated fluorocarbon-based gas expressed by $C_xF_{(2x+2)}$ (x represents a natural number of 5 or larger) into a processing chamber; and etching the oxide film on the substrate in a plasma atmosphere within the processing chamber.

In this case, it is possible to increase an etching rate while maintaining a high etching selectivity. Further, the additive gas may be $C_5F_{12}$ gas, $C_6F_{14}$ gas or $C_7F_{16}$ gas.

In accordance with still another aspect of the present invention, there is provided a method for etching an oxide film formed on a substrate, including the steps of: introducing an etching gas including a main gas composed of an unsaturated fluorocarbon-based gas and an additive gas composed of a cyclic saturated fluorocarbon-based gas expressed by $C_xF_{2x}$ (x represents a natural number of 5 or larger) into a processing chamber; and etching the oxide film on the substrate in a plasma atmosphere within the processing chamber.

With such method, it is possible to increase an etching rate while maintaining a high etching selectivity. Further, the additive gas may be $C_5F_{10}$ gas or $C_6F_{12}$ gas.

The main gas may be either $C_5F_8$ gas or $C_4F_6$ gas. Further, the main gas may be a cyclic unsaturated fluorocarbon-based gas such as either $C_6F_6$ gas or $C_7F_8$ gas.

In accordance with still another aspect of the present invention, there is provided a method for evaluating any one of the etching gases described above, including the steps of: decomposing an etching gas into a multiplicity of fluorocarbon ions by applying an electronic energy and detecting types of the fluorocarbon ions generated from the etching gas in an etching process and a composition ratio of each of the fluorocarbon ions, by using a mass spectrometer; calculating a value expressed by $P \times N_F/(M)^{0.5}$ indicating a level of impact amount of fluorine atoms of each of the fluorocarbon ions per unit time against the substrate in the etching process based on the mass M, the number of fluorine atoms $N_F$ and the composition ratio P of each of the fluorocarbon ions detected; adding up all of those calculated values, to thereby obtain a total added value; and evaluating the etching rate of the etching process by using the etching gas based on the total added value. Further, the term "composition ratio" means an occupancy ratio of each fluorocarbon ion with respect to the total number of ions of the generated fluorocarbon ions.

In accordance with the evaluation method of the present invention, the evaluation of an etching gas can be carried out without performing an actual etching process. As a result, time and cost required to develop an etching gas can be reduced, thereby efficiently performing the development of the etching gas.

The above evaluation method may further include the steps of: calculating a value expressed by $P \times N_C/(M)^{0.5}$ indicating a level of impact amount of carbon atoms of each of the fluorocarbon ions per unit time against the substrate in the etching process based on the mass M, the number of carbon atoms $N_C$ and the composition ratio P of each of the fluorocarbon ions detected; adding up all of those calculated values, to thereby obtain a total added value; and evaluating the etching selectivity of the etching process by using the etching gas based on the total added value.

In accordance with the present invention, in etching an oxide film, it is possible to increase an etching rate while maintaining a high etching selectivity, thereby resulting in, e.g., an increased productivity of semiconductor devices.

BRIEF DESCRIPTION OF THE DRAWINGS

The above and other objects and features of the present invention will become apparent from the following description of preferred embodiments given in conjunction with the accompanying drawings, in which.

DETAILED DESCRIPTION OF THE PREFERRED EMBODIMENTS

Figure 1:
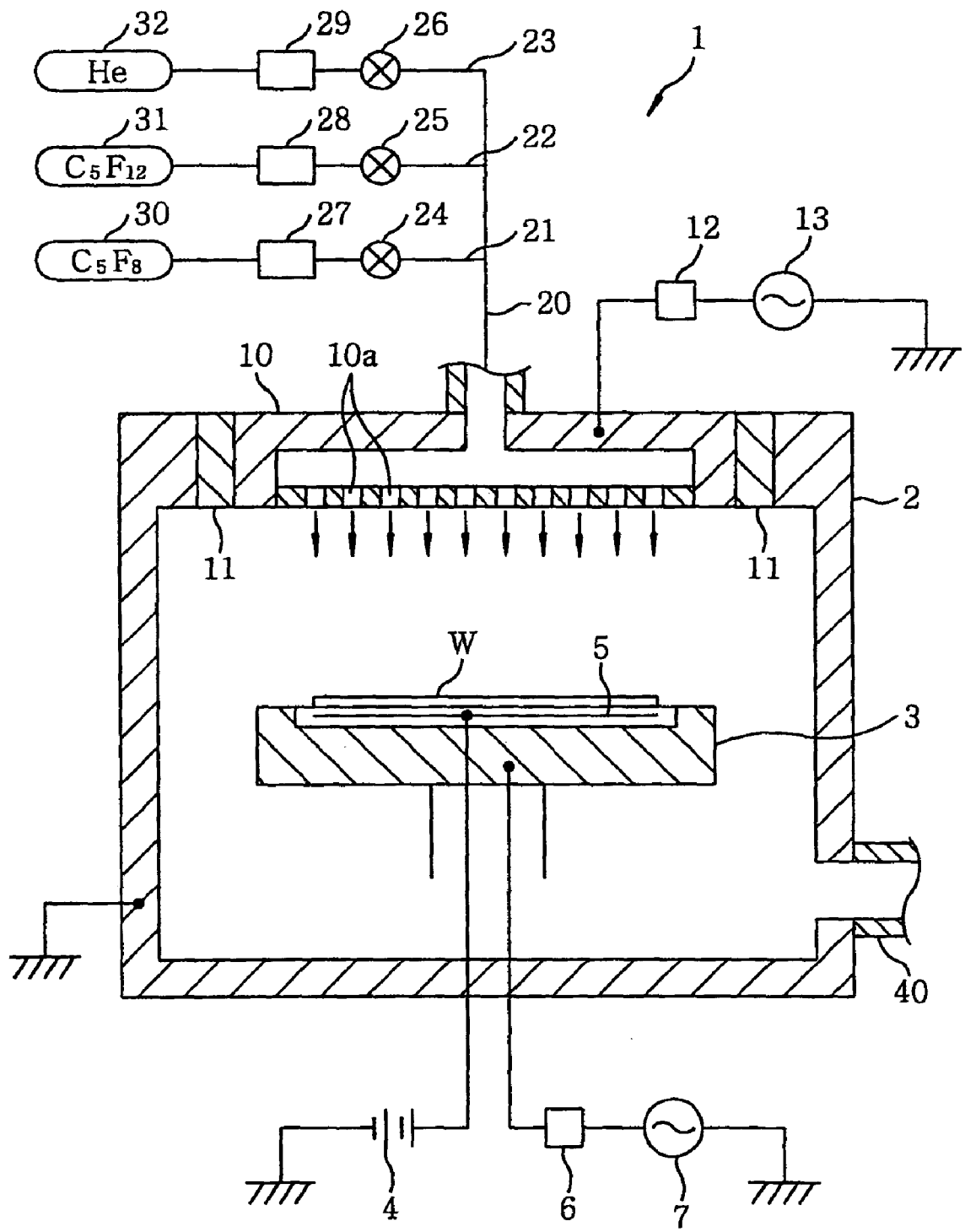
FIG. 1 provides a longitudinal cross sectional view to describe a schematic configuration of a plasma etching apparatus in accordance with a preferred embodiment of the present invention.

Hereinafter, preferred embodiments of the present invention will be described in detail. FIG. 1 provides a longitudinal cross sectional view showing a schematic configuration of a plasma etching apparatus 1 which employs an etching method in accordance with the present invention.

As shown in FIG. 1, the plasma etching apparatus 1 includes a cylindrical processing vessel 2 having a top opening and a base. The processing vessel 2 is electrically grounded. A vertically movable lower electrode 3 also serving as a mounting table for mounting a wafer W thereon is installed at a central portion of the processing vessel 2. Installed on a top surface of the lower electrode 3 is an electrostatic chuck 5 connected to a high voltage DC power supply 4. The electrostatic chuck 5 attracts the wafer W electrostatically such that the wafer W is maintained on the lower electrode 3. Further, the lower electrode 3 can be maintained at a predetermined temperature by a heater buried therein and a temperature controlling mechanism (not shown) including a temperature detector or the like. Also, a first high frequency power supply 7 for attracting ions is connected to the lower electrode 3 via a matching unit 6.

An upper electrode 10 of, e.g., a disc shape is disposed at a ceiling portion of a processing chamber 2, wherein the ceiling portion is configured to face a mounting surface of the lower electrode 3. An annular insulator 11 is interposed between the upper electrode 10 and the processing vessel 2 such that the upper electrode 10 and the processing vessel 2 are electrically isolated from each other. A second high frequency power supply 13 for generating plasma is connected to the upper electrode 10 via a matching unit 12.

Moreover, a high frequency power of a frequency equal to or higher than, for example, 30 MHz is applied to the upper electrode 10 from the second high frequency power supply 13. On the other hand, a high frequency power of a frequency lower than that of the high frequency power from the second high frequency power supply 13, for example, a high frequency power of a frequency ranging from, e.g., about 1 to 30 MHz is applied to the lower electrode 3 from the first high frequency power supply 7.

Figure 2A:
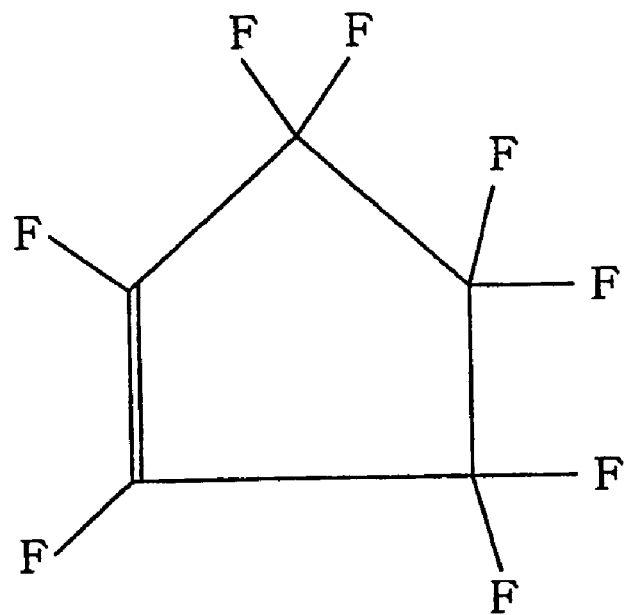
FIGS. 2A and 2B illustrate chemical constitutional formulas of c-$C_5F_8$ gas used as a main gas and $C_5F_{12}$ gas used as an additive gas, respectively.
Figure 2B:
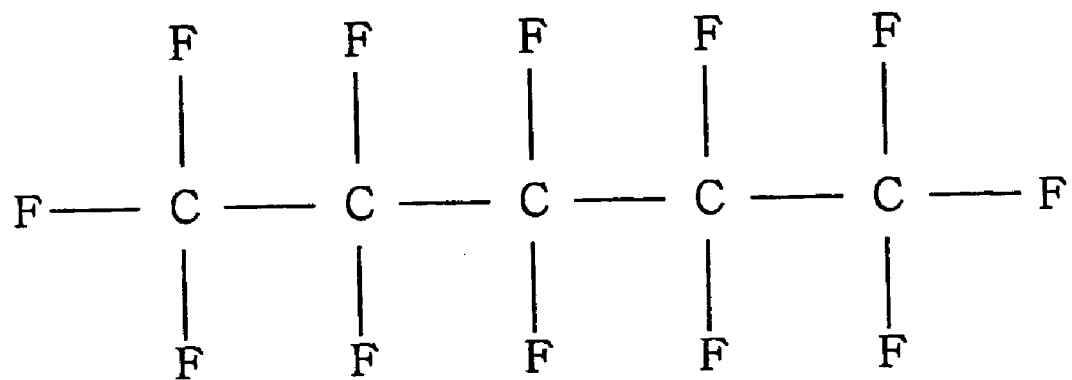

The upper electrode 10 is provided at its lower surface with a number of gas discharge openings 10a through which an etching gas is discharged into the processing vessel 2. The gas discharge openings 10a communicate with a gas supply line 20 connected to an upper surface of the upper electrode 10. The gas supply line 20 is connected in turn to, for example, three gas supply systems, i.e., to a first to a third gas supply system 21 to 23. The three gas supply systems 21 to 23 are coupled to gas supply sources 30 to 32 via opening/closing valves 24 to 26 and mass flow controllers 27 to 29, respectively. In the preferred embodiment, an unsaturated fluorocarbon-based gas, for example, c-$C_5F_8$ gas can be supplied from the gas supply system 21 as a main gas. Further, a straight-chain saturated fluorocarbon-based gas expressed by $C_xF_{(2x+2)}$ (x represents a natural number), for example, $C_5F_{12}$ gas can be supplied from the second gas supply system 22 as an additive gas. Moreover, for example, He gas can be supplied from the third gas supply system 23 as a rare gas species. The chemical constitutional formulas of the c-$C_5F_8$ gas and the $C_5F_{12}$ gas are illustrated in FIGS. 2A and 2B, respectively.

A gas exhaust line 40 connected with a gas exhausting mechanism (not shown) is coupled to a lower portion of the processing vessel 2. By vacuum evacuating the processing vessel 2 via the gas exhaust line 40, the internal pressure of the processing vessel 2 can be maintained at a preset level.

An etching method employed by the plasma etching apparatus 1 with the above configuration will now be described for the case of etching, for example, a silicon oxide film formed on a wafer W. First, the wafer W is loaded into the processing vessel 2 to be mounted on the lower electrode 3 and is maintained thereon by being attracted by the electrostatic chuck 5. Then, the processing vessel 2 is evacuated via the gas exhaust line 40, and a predetermined etching gas is supplied into the processing vessel 2 through the gas discharge openings 10a. The processing vessel 2 is maintained at a preset vacuum level, for instance, about 4 Pa (30 mTorr).

The etching gas discharged through the gas discharge openings 10a includes the c-$C_5F_8$ gas, the $C_5F_{12}$ gas and the He gas supplied from the gas supply systems 21 to 23, respectively. The flow rate ratio of the c-$C_5F_8$ gas and the $C_5F_{12}$ gas is set to be 1 to 0.5~1.

If the internal pressure of the processing vessel 2 reaches the preset vacuum level, a high frequency power of, e.g., 13.56 MHz and 2 kW is applied to the lower electrode 3 from the first high frequency power supply 7, and a high frequency power of, e.g., 60 MHz and 2 kW is applied to the upper electrode 10 from the second high frequency power supply 13. As a result, plasma is generated within the processing vessel 2, the etching gas is ionized and then the etching is performed on the silicon oxide film on the wafer W. After a lapse of a predetermined time period, the application of the high frequency powers and the supply of the etching gas are stopped, and the wafer W is unloaded from the processing vessel 2, thus completing the etching process.

Figures 3, 4:
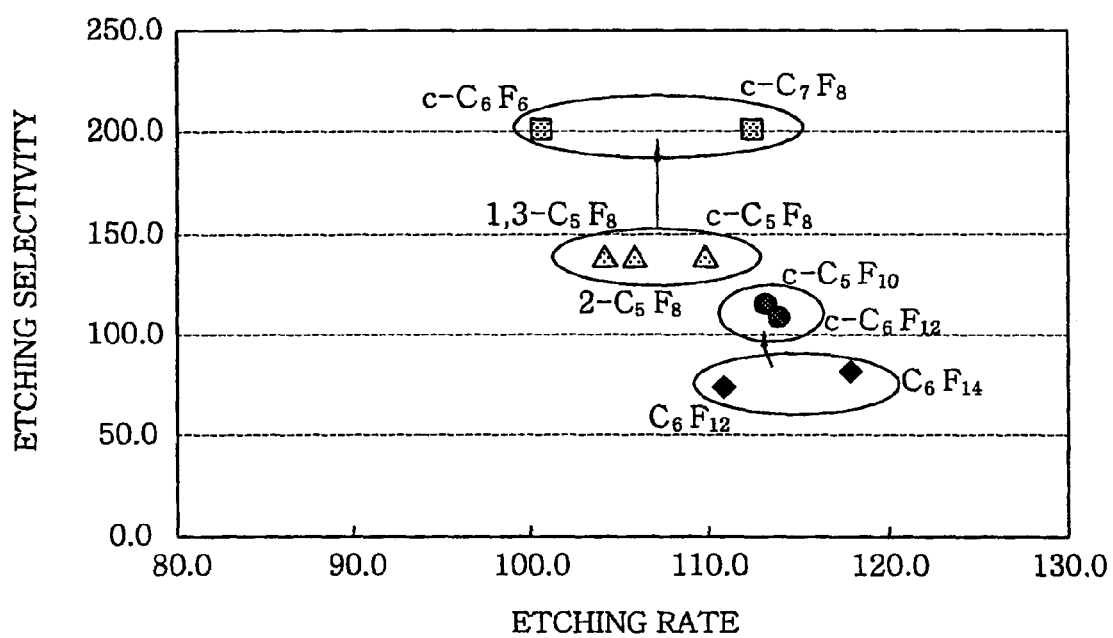
FIG. 3 presents a table that shows the increase in etching rates when either $C_5F_{12}$ gas or $C_6F_{14}$ gas is used as an additive gas.
FIG. 4 sets forth a graph to explain a relationship between an etching rate and an etching selectivity in case of using a fluorocarbon-based gas.

When performing an etching by adding the high-order straight-chain saturated $C_5F_{12}$ gas to the unsaturated c-$C_5F_8$ gas serving as a main gas as in the preferred embodiment of the present invention, a simulation result conducted by the inventors revealed that the etching rate was increased by 126% in comparison with a case of using no additive gas, as shown in FIG. 3. Further, when compared with a case of adding a low-order straight-chain saturated $C_3F_8$ having a smaller number of fluorine atoms as an additive gas, the etching rate in the case of using the $C_5F_{12}$ gas was also found to be further increased by as much as 8%. Moreover, in case of adding straight-chain $C_6F_{14}$ gas having a greater number of fluorine atoms than the $C_5F_{12}$ gas, the etching rate was found to be increased by 133% and 14% in comparison with the cases of using no additive gas and using the $C_3F_8$ gas, respectively. Also, in case of using the unsaturated c-$C_5F_8$ gas featuring a high ratio of carbon atoms as a main gas, polymer generated from the c-$C_5F_8$ gas would be deposited on the mask surface of the silicon oxide film, thus keeping a high etching selectivity.

Accordingly, by using the c-$C_5F_8$ gas as a main gas and adding the $C_5F_{12}$ gas or the $C_6F_{14}$ gas thereto, etching rate can be improved greatly, while maintaining the high etching selectivity.

Though the above preferred embodiment has been described for the cases of using the $C_5F_{12}$ gas and the $C_6F_{14}$ gas as an additive gas, any straight-chain saturated fluorocarbon-based gas expressed by $C_xF_{(2+2)}$ (x represents a natural number of 7 or larger), for example, $C_7F_{16}$ gas, may be employed. Since these fluorocarbon-based gases have same characteristics as those of the $C_5F_{12}$ gas or the $C_6F_{14}$ gas, a high etching rate can be obtained similarly as in the above preferred embodiment when they are used as an additive gas.

Moreover, in the above-described preferred embodiment, same effects can be achieved by using 1,3-$C_5F_8$ gas or 2-$C_5F_8$ gas instead of the c-$C_5F_8$ gas as the main gas. Further, it is also possible to achieve the same effects by using any unsaturated fluorocarbon-based gas other than the $C_5F_8$ gas, for example, $C_4F_6$ gas. Here, the $C_4F_6$ gas may be a cyclic c-$C_4F_6$ gas, straight-chain 1,3-$C_4F_6$ gas or straight-chain 2-$C_4F_6$ gas.

Though the He gas is supplied into the processing vessel 2 from the third gas supply system 23 during the etching process, another rare gas species such as Ne gas, Ar gas or Xe gas can be supplied instead. Further, oxygen gas or a nonreactive gas may be supplied in lieu of the rare gas species.

Furthermore, though as the additive gas, a straight-chain saturated fluorocarbon-based gas expressed by $C_xF_{(2x+2)}$ (x represents a natural number of 5 or larger) was used in the above-described preferred embodiment, a cyclic saturated fluorocarbon-based gas expressed by $C_xF_{(2x)}$ (x represents a natural number of 5 or larger) could be used instead. According to a simulation result provided in FIG. 4, in comparison with the cases of using straight-chain saturated $C_5F_{12}$ gas and $C_6F_{14}$ gas, a higher etching selectivity can be obtained when using, for example, cyclic saturated c-$C_5F_{10}$ gas or c-$C_6F_{12}$ gas as an additive gas, while exhibiting the same level of etching rate. Thus, by using the cyclic saturated fluorocarbon-based gas expressed by $C_xF_{(2x)}$ (x represents a natural number of 5 or larger) as an additive gas, a higher level of etching selectivity can be realized.

Though the unsaturated $C_5F_8$ gas is used as the main gas in the preferred embodiment, a higher-order cyclic unsaturated carbon based gas having at least 6 carbon atoms may be employed instead. The simulation result in FIG. 4 shows that a higher etching selectivity can be obtained by using, for example, cyclic unsaturated c-$C_6F_6$ gas or c-$C_7F_8$ gas as a main gas instead of the unsaturated $C_5F_8$ gas, while maintaining the same level of etching rate as that in the case of using the $C_5F_8$ gas. Accordingly, by using a high-order cyclic unsaturated fluorocarbon-based gas as a main gas, the etching selectivity can be further improved. Moreover, if both etching rate and etching selectivity are taken into consideration in selecting gases, a combination of $C_7F_8$ gas as a main gas and $C_6F_{14}$ gas as an additive gas can be a preferable choice based on the information given in FIG. 4.

Figure 5:
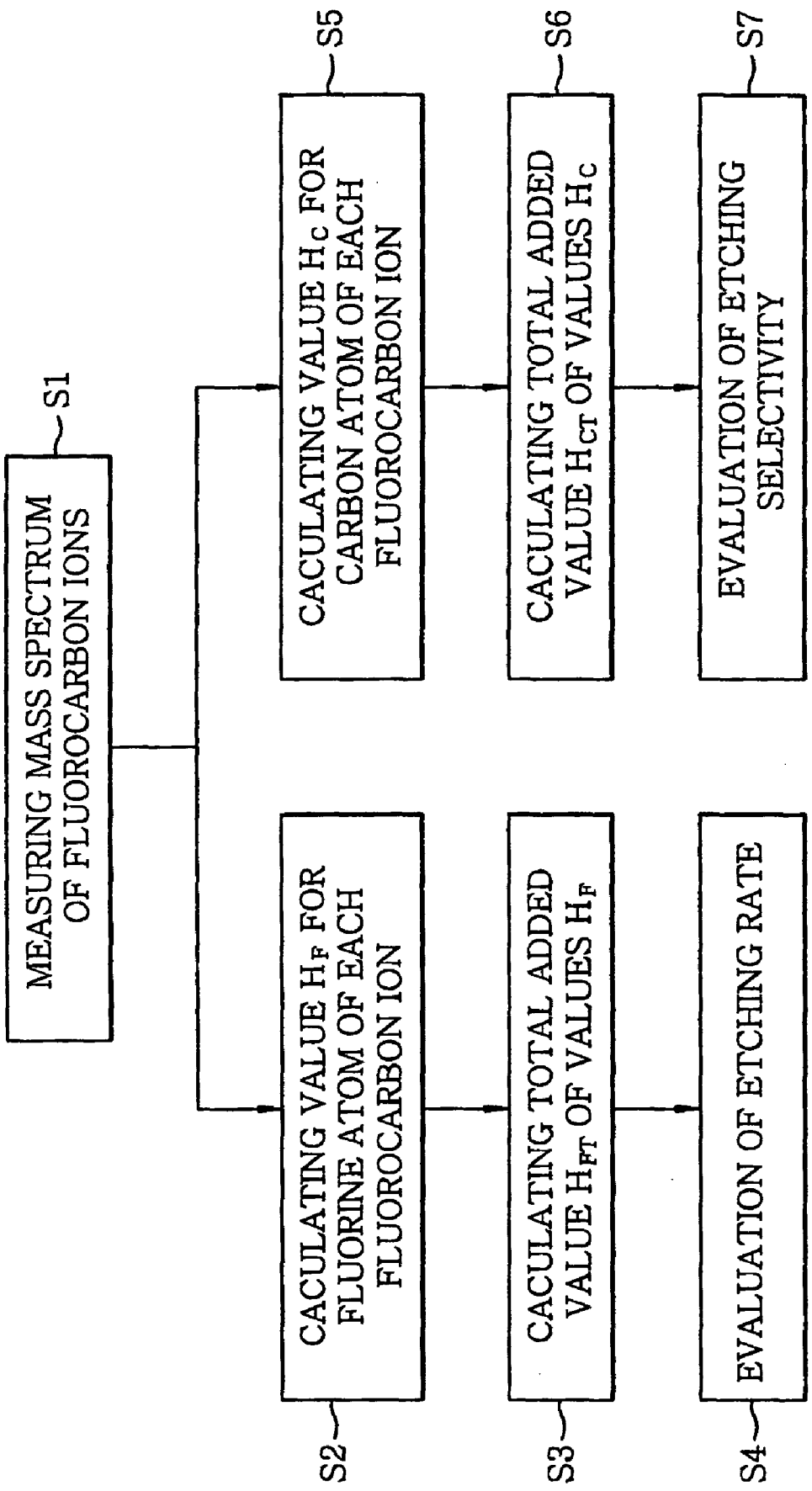
FIG. 5 depicts a flow chart describing an evaluation method for an etching gas.

In the above-described preferred embodiment, however, the etching rate and the etching selectivity of each etching gas are determined through simulations. Conventionally, in order to evaluate a new etching gas, an etching process has to be actually performed in an etching apparatus by using the new etching gas, and the evaluation of the etching gas is carried out by accumulating thus obtained data. However, this conventional evaluation method is time-consuming because an actual processing has to be performed whenever the evaluation of an etching gas is necessary. Furthermore, in case the evaluation result of the etching gas is poor, the experiment would turn out to be a waste of time. Still further, in the conventional method, one has to have an experimental equipment such as the etching apparatus to develop a new etching gas. Here, as a solution to these problems of the conventional evaluation method, a new method employing a simulation for evaluating an etching gas will be proposed. Hereinafter, the etching gas evaluation method will be described. FIG. 5 is a flow chart thereof.

Figure 6:
FIG. 6 is a schematic view of an apparatus for use in the etching gas evaluation method.

In a mass spectrometer 100 illustrated in FIG. 6, a predetermined electronic energy is first applied to an etching gas to be evaluated, and the etching gas is decomposed into a number of fluorocarbon ions and their mass spectrum is measured (S1 in FIG. 5). As a result, the types and the composition ratio of the fluorocarbon ions generated from the etching gas during an etching process are detected. At this time, an electronic energy of, e.g., 10 to 100 eV close to, e.g., an electronic energy within plasma during the etching process is applied to the etching gas in the mass spectrometer 100.

Figure 7:
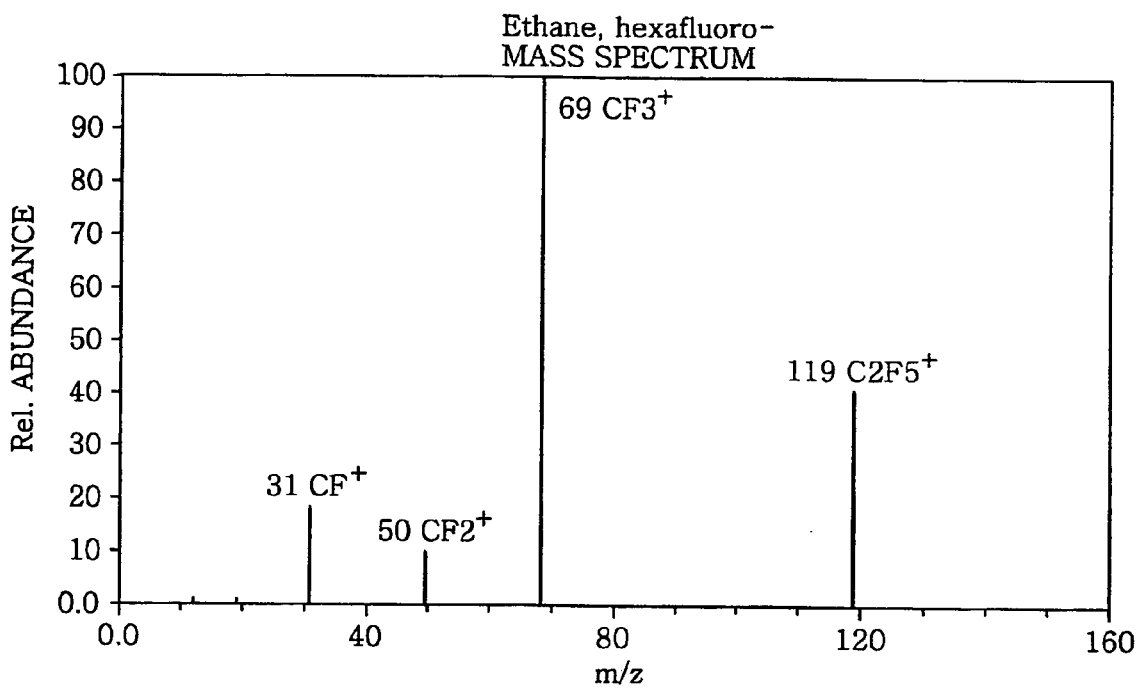
FIG. 7 provides a graph showing a mass spectrum of $C_2F_6$ gas.

For example, when the etching gas to be evaluated is $C_2F_6$ gas, a mass spectrum is obtained as shown in FIG. 7, and four fluorocarbon ions including $CF^+$, $CF_2^+$, $CF_3^+$ and $C_2F_5^+$ are identified. Moreover, the composition ratio $P_x$ ($CF^+$:$P_1$, $CF_2^+$: $P_2$, $CF_3^+$:$P_3$, $C_2F_5^+$:$P_4$) of each of the fluorocarbon ions $CF^+$, $CF_2^+$, $CF_3^+$ and $C_2F_5^+$ is detected.

Thereafter, data of the fluorocarbon ions detected by the mass spectrometer 100 is inputted to a computer 101, as shown in FIG. 6. The computer 101 calculates a value $H_F$ representing a level of impact amount of fluorine atoms of each fluorocarbon ion against a wafer W per unit time based on the mass fluorocarbon ion, the number $N_F$ of fluorine atoms and the composition ratio $P_X$ (S2 in FIG. 5)

An impact amount $H_{FS}$ of the fluorine atoms of each fluorocarbon ion can be expressed by a multiplication of the number $N_F$ of fluorine atoms, the composition ratio $P_X$ and a speed V of each fluorocarbon ion, i.e., $H_{FS}=P_X \times N_F \times V$. The speed V of each fluorocarbon ion can be expressed by $V=(2e/M)^{(0.5)}$ from the equation of kinetic energy ($e=\frac{1}{2}\times MV^2$). Accordingly, the impact amount $H_{FS}$ can be expressed by $H_{FS}=P_X\times N_F\times V=P_X\times N_F\times(2e/M)^{(0.5)}$. If the incident ion energy is constant, the speed V of each fluorocarbon ion is in proportion to $1/M^{(0.5)}$), so that a relationship of $H_{FS} \propto P_X\times N_F/(M)_{(0.5)}$ is obtained. Consequently, a value $H_F$ representing a level of the impact amount $H_{FS}$ can be expressed by $H_F=P_X\times N_F/(M)^{(0.5)} \propto H_{FS}$.

For example, as for $C_2F_6$ gas as shown in FIG. 7, the mass of $CF^+$ has a value of 31 and the number of its fluorine atoms is 1; the mass of $CF_2^+$ has a value of 50 and the number of its fluorine atoms is 2; the mass of $CF_3^+$ has a value of 69 and the number of its fluorine atoms is 3; and the mass of $C_2F_5^+$ has a value of 119 and the number of its fluorine atoms is 5. Accordingly, assuming that the energies of the fluorocarbon ions are identical to each other, the values $H_F$ representing the levels of the impact amount of fluorine atoms of the respective fluorocarbon ions per unit time can be expressed by $P_1\times 1/(31)^{(0.5)}$, $P_2\times 2/(50)^{(0.5)}$, $P_3\times 3/(69)^{(0.5)}$ and $P_4\times 5/(119)^{(0.5)}$, respectively.

Then, the values $H_F$ of the fluorocarbon ions are all added up (S3 in FIG. 5), to thereby obtain a total added value $H_{FT}$. For example, in case of the $C_2F_6$ gas, the total added value $H_{FT}$ becomes $P_1\times 1/(31)^{(0.5)}+P_2\times 2/(50)^{(0.5)}+P_3\times 3/(69)^{(0.5)}+P_4\times 5/(119)^{(0.5)}$. The total added value $H_{FT}$ represents a level of the total impact amount of the fluorine atoms of the fluorocarbon ions of the entire etching gas, and is utilized as an index to evaluate an etching rate which is dependent on the total impact amount of the fluorine atoms. Based on the total added value $H_{FT}$ of the etching gas, its etching rate is estimated by using a relation between that and a total added value of another etching gas (S4 in FIG. 5).

Moreover, based on the mass M, the composition ratio $P_X$ and the number $N_C$ of carbon atoms of each fluorocarbon ion detected by the mass spectrometer 100, the computer 101 calculates a value $H_C$ representing a level of impact amount of carbon atoms of each fluorocarbon ion against the wafer W per unit time (S5 in FIG. 5). An impact amount $H_{CS}$ of the carbon atoms of each fluorocarbon ion can be expressed by $H_{CS}=P_X\times N_C\times V=P_X\times N_C\times(2e/M)^{(0.5)}$, as in the case of obtaining the impact amount of the fluorine atoms as described above. Thus, the value $H_C$ can be expressed by $H_C=P_X\times N_C/(M)^{(0.5)} \propto H_{cs}$.

For example, in case of the $C_2F_6$ gas as shown in FIG. 7, the number of carbon atoms of each of $CF^+$, $CF_2^+$ and $CF_3^+$ is 1 while the number of carbon atoms of $C_2F_5^+$ is 2. Therefore, the values $H_C$ of the fluorocarbon ions can be expressed by $P_1\times 1/(31)^{(0.5)}$, $P_2\times 1/(50)^{(0.5)}$, $P_3\times 1/(69)^{(0.5)}$ and $P_4\times 2/(119)^{(0.5)}$, respectively.

Then, the values $H_C$ of the fluorocarbon ions are all added up (S6 in FIG. 5), to thereby obtain a total added value $H_{CT}$. For example, in case of the $C_2F_6$ gas, the total added value $H_{CT}$ becomes $P_1\times 1/(31)^{(0.5)}+P_2\times 1/(50)^{(0.5)}+P_3\times 1/(69)^{(0.5)}+P_4\times 2/(119)^{(0.5)}$. The total added value $H^{CT}$ represents a level of the total impact amount of the carbon atoms of the fluorocarbon ions of the entire etching gas, and is utilized as an index to evaluate an etching selectivity which is dependent on the total impact amount of the carbon atoms. Based on the total added value $H_{CT}$ of the etching gas, its etching selectivity is estimated by using a relation between that and a total added value of another etching gas (S7 in FIG. 5).

Figure 8:
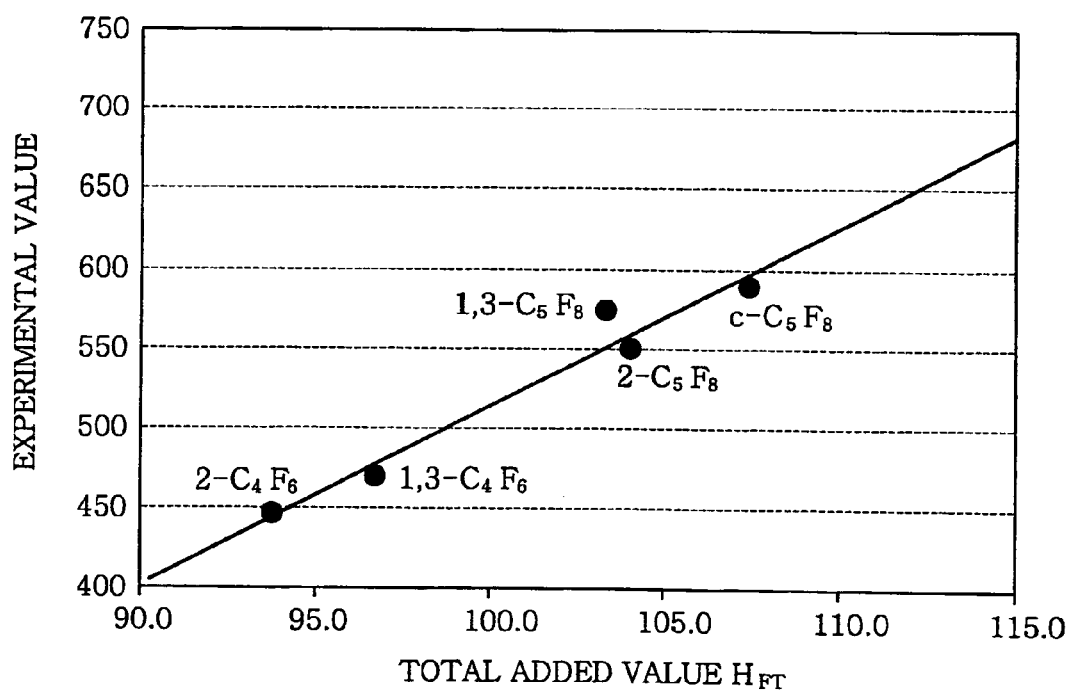
FIG. 8 illustrates a graph to describe a relationship between a total added value indicating an etching rate and an experimental value.
Figure 9:
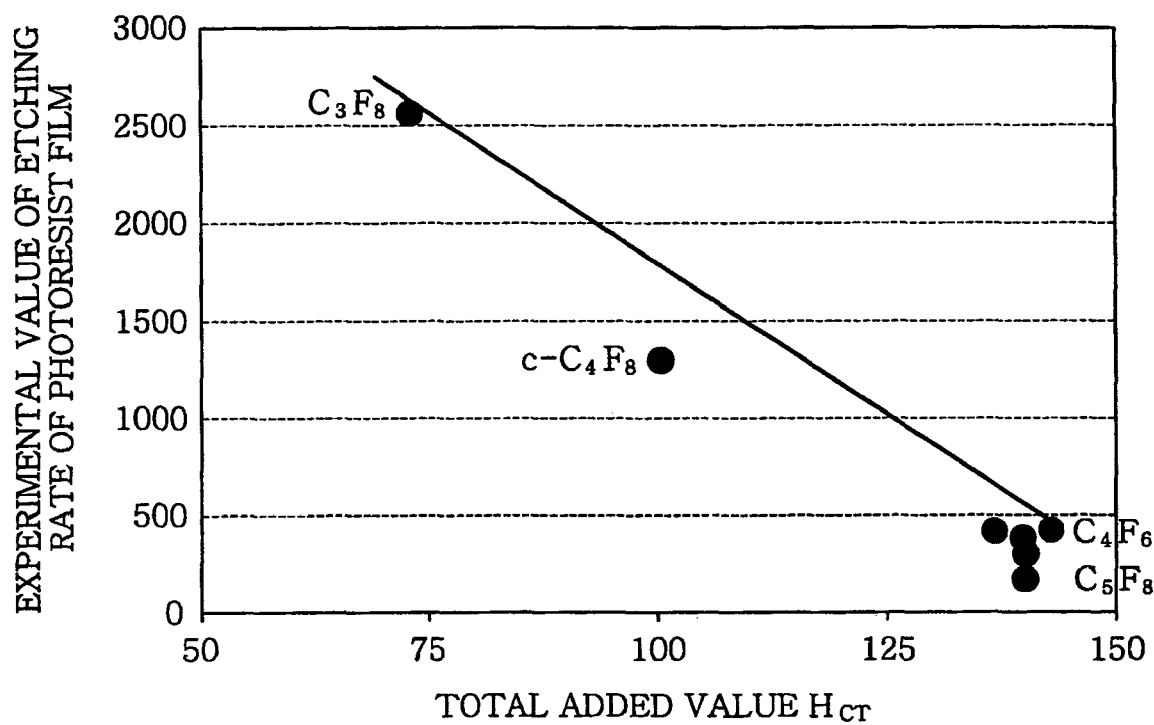
FIG. 9 depicts a graph to describe a relationship between a total added value indicating an etching selectivity and an experimental value.

FIG. 8 is a graph showing a relationship between a total added value $H_{FT}$ representing an etching rate obtained by the above-described etching gas evaluation method and an experimental value obtained by an actual experiment. As can be seen from FIG. 8, total added values $H_{FT}$ of a plurality of fluorocarbon-based gases are found to correspond to experimental values in a proportional relationship. Accordingly, by calculating and evaluating the total added value $H_{FT}$, the etching rate can be evaluated precisely. Moreover, FIG. 9 is a graph showing a relationship between a total added value $H_{CT}$ representing an etching selectivity obtained by the above-described etching gas evaluation method and an experimental value of an etching rate of a photoresist film on a film to be etched. Since an actual etching selectivity increases as an etching rate of the photoresist film decreases, the experimental value of the etching rate of the photoresist film is in inverse proportion to the actual etching selectivity of the film to be etched. As shown in FIG. 9, since the total added value $H_{CT}$ obtained by the above-described etching gas evaluation method is in reverse proportion to the experimental value of the etching rate of the photoresist film, it is revealed that the total added value $H_{CT}$ and the actual etching selectivity is in proportion to each other by one-to-one correspondence. Accordingly, it is possible to evaluate etching selectivity precisely by calculating the total added value $H_{CT}$.

Moreover, the above-described etching gas evaluation method may be applied for the evaluation of an etching gas other than the fluorocarbon-based gas. That is, the etching gas evaluation method may include the steps of decomposing an etching gas into a number of ions by applying a preset electronic energy and detecting the types of ions generated from the etching gas during an etching process and their composition ratios, by using a mass spectrometer; calculating a value expressed by $P\times N_I/(M)^{0.5}$ indicating a level of impact amount of an element, which constitutes each ion and affects the etching rate, against a substrate per unit time during the etching process based on the detected mass M and composition ratio P of each ion and the atom number $N_I$ of the element; adding up all of those calculated values to thereby obtain a total added value; and evaluating the etching rate of the etching process by using the etching gas based on the total added value.

Further, the etching gas evaluation method may further include the steps of calculating a value expressed by $P\times N_{II}/(M)^{0.5}$ indicating a level of impact amount of another element, which constitutes each ion and affects the etching rate, against the substrate per unit time during the etching process based on the detected mass M and composition ratio P of each ion and the atom number $N_{II}$ of the another element; adding up all of those calculated values, to thereby obtain a total added value; and evaluating the etching rate of the etching process by using the etching gas based on the total added value. The etching gas evaluation method can be applied to the evaluation of an etching gas formed of an organic material, for example, $NH_3$ gas.

Although there have been described the preferred embodiments of the present invention, the present invention is not limited thereto. For example, though the case of etching a semiconductor wafer has been exemplified in the preferred embodiment, the present invention may be applied to the etching of other types of substrates including, for example, a substrate for a flat panel display (FPD), a glass substrate for a photomask, and so forth.

In accordance with the present invention, it is possible to improve an etching rate while maintaining a high etching selectivity in case of etching an oxide film.

While the invention has been shown and described with respect to the preferred embodiments, it will be understood by those skilled in the art that various changes and modifications may be made without departing from the spirit and scope of the invention as defined in the following claims.

What is claimed is:

1. A method for etching an oxide film formed on a substrate, comprising the steps of:
   introducing an etching gas including a main gas composed of an unsaturated fluorocarbon-based gas having at least five carbon atoms and an additive gas composed of a straight-chain saturated fluorocarbon-based gas consisting of $C_5F_{12}$ or $C_6F_{14}$; and
   etching the oxide film on the substrate in a plasma atmosphere within the processing chamber.

2. The method of claim 1, wherein the main gas is cyclic unsaturated $C_6F_6$ gas or cyclic unsaturated $C_7F_8$ gas.

3. A method for evaluating an etching gas described in claim 1, comprising:
   performing a simulation of the etching gas prior to an actual etching process by decomposing in a mass spectrometer the etching gas into a multiplicity of fluorocarbon ions by supplying an electronic energy and detecting types of the fluorocarbon ions generated from the etching gas in an etching process and a composition ratio of each of the fluorocarbon ions;
   calculating a value expressed by $P \times N_F/(M)^{0.5}$ indicating a level of impact amount of fluorine atoms of each of the fluorocarbon ions per unit time against the substrate in the etching process based on the mass M, the number of fluorine atoms $N_F$ and the composition ratio P of each of the fluorocarbon ions detected;
   adding up all of those calculated values, to thereby obtain a total added value; and
   evaluating prior to said actual etching process the etching rate of the etching process based on the total added value.

4. The method of claim 3, further comprising the steps of:
   calculating a value expressed by $P \times N_C/(M)^{0.5}$ indicating a level of impact amount of carbon atoms of each of the fluorocarbon ions per unit time against the substrate in the etching process based on the mass M, the number of carbon atoms $N_C$ and the composition ratio P of each of the fluorocarbon ions detected;
   adding up all of those calculated values, to thereby obtain a total added value; and
   evaluating the etching selectivity of the etching process using the etching gas based on the total added value.

5. A method for evaluating an etching gas including a main gas composed of an unsaturated fluorocarbon-based gas and an additive gas composed of a cyclic saturated fluorocarbon-based gas expressed by $C_XF_{2X}$, wherein x represents a natural number of 5 or larger, comprising:
   performing a simulation of the etching gas prior to an actual etching process by decomposing in a mass spectrometer the etching gas into a multiplicity of fluorocarbon ions by supplying an electronic energy and detecting types of the fluorocarbon ions generated from the etching gas in an etching process and a composition ratio of each of the fluorocarbon ions;
   calculating a value expressed by $P \times N_F/(M)^{0.5}$ indicating a level of impact amount of fluorine atoms of each of the fluorocarbon ions per unit time against the substrate in the etching process based on the mass M, the number of fluorine atoms $N_F$ and the composition ratio P of each of the fluorocarbon ions detected;
   adding up all of those calculated values, to thereby obtain a total added value; and
   evaluating prior to said actual etching process the etching rate of the etching process based on the total added value.

6. The method of claim 5, further comprising the steps of:
   calculating a value expressed by $P \times N_C/(M)^{0.5}$ indicating a level of impact amount of carbon atoms of each of the fluorocarbon ions per unit time against the substrate in the etching process based on the mass M, the number of carbon atoms $N_C$ and the composition ratio P of each of the fluorocarbon ions detected;
   adding up all of those calculated values, to thereby obtain a total added value; and
   evaluating the etching selectivity of the etching process using the etching gas based on the total added value.

7. The method of claim 1, wherein the main gas is cyclic unsaturated $C_5F_8$ gas.

8. The method of claim 5, wherein the main gas is cyclic unsaturated $C_5F_8$ gas.

9. A method for evaluating an etching gas including a main gas composed of an unsaturated fluorocarbon-based gas and an additive gas composed of a fluorocarbon-based gas expressed by $C_XF_{(2X+2)}$ or $C_XF_{2X}$, wherein x represents a natural number of 5 or larger, comprising:
   performing a simulation of the etching gas prior to an actual etching process by decomposing in a mass spectrometer the etching gas into a multiplicity of fluorocarbon ions by supplying an electronic energy to the etching gas and detecting types of the fluorocarbon ions generated from the etching gas in an etching process and a composition ratio of each of the fluorocarbon ions;
   calculating a value expressed by $P \times N_F/(M)^{0.5}$ indicating a level of impact amount of fluorine atoms of each of the fluorocarbon ions per unit time against the substrate in the etching process based on the mass M, the number of fluorine atoms $N_F$ and the composition ratio P of each of the fluorocarbon ions detected;
   adding up all of those calculated values, to thereby obtain a total added value; and
   evaluating prior to said actual etching process the etching rate of the etching process based on the total added value.

10. The method of claim 5, wherein the main gas is cyclic unsaturated $C_6F_6$ gas or cyclic unsaturated $C_7F_8$ gas.

* * * * *